United States Patent
Jenkins (10) Patent No.: US 10,819,721 B1
(45) Date of Patent: Oct. 27, 2020

(54) SYSTEMS AND METHODS FOR MONITORING TRAFFIC ON INDUSTRIAL CONTROL AND BUILDING AUTOMATION SYSTEM NETWORKS

(71) Applicant: National Technology & Engineering Solutions of Sandia, LLC, Albuquerque, NM (US)

(72) Inventor: Chris Jenkins, Albuquerque, NM (US)

(73) Assignee: National Technology & Engineering Solutions of Sandia, LLC, Albuquerque, NM (US)

( * ) Notice: Subject to any disclaimer, the term of this patent is extended or adjusted under 35 U.S.C. 154(b) by 321 days.

(21) Appl. No.: 15/899,893

(22) Filed: Feb. 20, 2018

Related U.S. Application Data (60) Provisional application No. 62/461,503, filed on Feb. 21, 2017.

(51) Int. Cl.
*H04L 29/06* (2006.01)
*H04L 12/26* (2006.01)
*H04L 12/24* (2006.01)

(52) U.S. Cl.
CPC .......... *H04L 63/1425* (2013.01); *H04L 41/22* (2013.01); *H04L 43/045* (2013.01)

(58) Field of Classification Search
CPC .................................................. H04L 63/1425
See application file for complete search history.

(56) References Cited

U.S. PATENT DOCUMENTS

| | | | |
|---|---|---|---|
| 8,320,243 B2 | 11/2012 | Choi et al. | |
| 8,364,833 B2 | 1/2013 | Bennett et al. | |
| 9,166,994 B2 * | 10/2015 | Ward | H04L 63/1425 |
| 9,379,888 B2 | 6/2016 | Moreno et al. | |
| 9,412,073 B2 | 8/2016 | Brandt et al. | |
| 10,462,170 B1 * | 10/2019 | Wang | G06F 21/554 |
| 2009/0328219 A1 * | 12/2009 | Narayanaswamy | H04L 63/20 726/23 |
| 2010/0218250 A1 * | 8/2010 | Mori | H04L 63/1416 726/22 |
| 2016/0028693 A1 | 1/2016 | Crawford | |
| 2017/0126745 A1 | 5/2017 | Taylor | |
| 2018/0144101 A1 * | 5/2018 | Bitran | G06F 19/3418 |
| 2019/0297113 A1 * | 9/2019 | Yang | H04L 47/20 |
| 2020/0007396 A1 * | 1/2020 | Fainberg | H04L 41/0893 |

FOREIGN PATENT DOCUMENTS

EP    3190769 A1    7/2017

* cited by examiner

*Primary Examiner* — Simon P Kanaan

(74) *Attorney, Agent, or Firm* — Madelynne J. Farber; Mark A. Dodd

(57) ABSTRACT

Technologies relating to monitoring communications traffic to detect potential attacks on industrial control system networks and building automation system networks are described herein. In an embodiment, a monitoring device receives a plurality of communications from a control network. The monitoring device transmits the communications to a computing device. Based on the communications, the computing device generates a listing of devices that communicated by way of the control network over a period of time, and computes a volume of traffic between each pair of devices in the listing of devices. The computing device then outputs a graphical user interface (GUI) by way of display, the GUI comprising data indicative of the computed volumes of traffic, which may be indicative of a potential attack on the control network.

17 Claims, 8 Drawing Sheets

SYSTEMS AND METHODS FOR MONITORING TRAFFIC ON INDUSTRIAL CONTROL AND BUILDING AUTOMATION SYSTEM NETWORKS

RELATED APPLICATIONS

This application claims priority to U.S. Provisional Patent Application No. 62/461,503 filed on Feb. 21, 2017 and entitled "VISUALIZATION APPARATUS, SYSTEM AND METHOD FOR NETWORKS", the entirety of which is incorporated herein by reference.

STATEMENT OF GOVERNMENTAL INTEREST

This invention was made with Government support under Contract No. DE-NA0003525 awarded by the United States Department of Energy/National Nuclear Security Administration. The U.S. Government has certain rights in the invention.

BACKGROUND

Networked devices are now commonly employed in industrial control systems and building automation systems to facilitate effective and efficient control over various industrial control and building automation field devices (e.g., sensors, actuators, motors, door locks, heating and cooling systems, etc.). These networked devices may be subject to cyberattack by way of the networks over which they communicate. Industrial control and building automation systems are generally employed to control the operation of physical devices that perform various mechanical operations. Thus, attacks against industrial control and building automation systems by way of their networked components can ultimately cause significant physical damage to plants or buildings that these systems control.

Components of industrial control and building automation systems communicate according to a variety of different protocols, and over a variety of different types of physical connections. Conventional cyberattack mitigation systems are generally unable to monitor traffic between industrial or building automation controllers and field devices that are controlled by the controllers. Further, conventional cyberattack mitigation systems do not monitor traffic between industrial or building automation controllers within an industrial or building automation control system.

SUMMARY

The following is a brief summary of subject matter that is described in greater detail herein. This summary is not intended to be limiting as to the scope of the claims.

Technologies pertaining to monitoring communications traffic on industrial control and building automation system networks are described herein. In an exemplary embodiment, an industrial control system (ICS) environment includes a plurality of programmable logic controllers (PLCs), each of which controls input/output (I/O) operations with respect to one or more field devices in an ICS. In the exemplary ICS environment, the PLCs communicate by way of a network that can include one or more sub-networks. For example, each of the PLCs comprises a sub-network comprising modules of the PLC that communicate by way of a backplane of the PLC. A communications traffic monitoring device (TMD) is communicatively connected to the network, and receives a plurality of communications transmitted by way of the network. In one example, a TMD is included as a module of a PLC in the plurality of PLCs and receives communications exchanged between other modules of the PLC by way of the backplane of the PLC. In another example, a TMD is communicatively coupled to a communications bus by way of which first and second PLCs in the plurality of PLCs communicate, and the TMD receives communications exchanged between the first and second PLCs by way of the communications bus.

In another exemplary embodiment, a building automation system (BAS) environment includes a plurality of BAS controllers that control I/O operations with respect to one or more field devices in a BAS. In the exemplary BAS environment, the BAS controllers communicate with one another or with a supervisory computing device by way of a network. A TMD is communicatively coupled to the network and receives a plurality of communications transmitted by way of the network. For example, the TMD receives communications exchanged between a first BAS controller and a second BAS controller that control field devices for different building subsystems (e.g., lighting devices and security devices). In another example, the TMD receives communications exchanged between a BAS controller and the supervisory computing device.

A computing device is communicatively coupled to a TMD that receives communications transmitted by way of an ICS or BAS network. The computing device receives a plurality of communications (e.g., data packets) from the TMD and generates a listing of devices that communicate by way of the network based upon the communications received from the TMD. The computing device is further configured to identify a source device and a destination device for each of the communications received from the TMD. The computing device computes a volume of traffic between each pair of devices in the listing of devices. Data indicative communications traffic on an ICS or BAS network, which may be indicative of a potential attack on an ICS or BAS, can be presented to a supervisor of the system on a display of the computing device. In an example, the computing device displays a directed graph representation of communications received by the TMD from the network, wherein nodes of the graph represent physical or logical devices on the network and directed edges between nodes include data indicative of the volume of communications between the devices represented by the connected nodes.

The above summary presents a simplified summary in order to provide a basic understanding of some aspects of the systems and/or methods discussed herein. This summary is not an extensive overview of the systems and/or methods discussed herein. It is not intended to identify key/critical elements or to delineate the scope of such systems and/or methods. Its sole purpose is to present some concepts in a simplified form as a prelude to the more detailed description that is presented later.

DETAILED DESCRIPTION

Various technologies pertaining to detection of a potential attack on ICS and BAS networked devices are now described with reference to the drawings, wherein like reference numerals are used to refer to like elements throughout. In the following description, for purposes of explanation, numerous specific details are set forth in order to provide a thorough understanding of one or more aspects. It may be evident, however, that such aspect(s) may be practiced without these specific details. In other instances, well-known structures and devices are shown in block diagram form in order to facilitate describing one or more aspects. Further, it is to be understood that functionality that is described as being carried out by certain system components may be performed by multiple components. Similarly, for instance, a component may be configured to perform functionality that is described as being carried out by multiple components.

Moreover, the term "or" is intended to mean an inclusive "or" rather than an exclusive "or." That is, unless specified otherwise, or clear from the context, the phrase "X employs A or B" is intended to mean any of the natural inclusive permutations. That is, the phrase "X employs A or B" is satisfied by any of the following instances: X employs A; X employs B; or X employs both A and B. In addition, the articles "a" and "an" as used in this application and the appended claims should generally be construed to mean "one or more" unless specified otherwise or clear from the context to be directed to a singular form.

Further, as used herein, the terms "component" and "system" are intended to encompass computer-readable data storage that is configured with computer-executable instructions that cause certain functionality to be performed when executed by a processor. The computer-executable instructions may include a routine, a function, or the like. It is also to be understood that a component or system may be localized on a single device or distributed across several devices. Additionally, as used herein, the term "exemplary" is intended to mean serving as an illustration or example of something, and is not intended to indicate a preference.

Various technologies pertaining to monitoring communications on ICS and BAS networks to facilitate detection of attacks on ICS and BAS networks are described herein. Attacks on an electronic or computer-based network are generally carried out by way of communications occurring on the network. In general, "desirable" communications on the network are those that are exchanged between devices in the ICS or BAS system to facilitate operation of an industrial or building automation process (e.g., manufacture of a product, turning on or off the lights in a building at certain times of day, operating the heating and cooling systems in a facility, etc.). For example, a communication, in addition to comprising data indicative of its source and destination devices, can comprise data that is configured to cause a device on the network to perform a task that furthers operation of the industrial or building automation process. By contrast, an attack on an ICS or BAS can be carried out by transmitting one or more communications that are targeted to a device on the ICS/BAS network and are configured to cause the device to perform an act that is not desired by the operator of the network. By way of example, an attack on an ICS network can include a communication targeted to a PLC on the ICS network, where the communication is configured to cause the PLC to operate a motor outside of operational safety limits of the motor, thereby causing damage.

In exemplary embodiments, a TMD receives communications such as data packets, bit streams, etc. that are transmitted by way of a communications network in an ICS or BAS system. Each of the communications originates from a respective source device and is routed by way of the network to a respective destination device. In some embodiments a communication received by the TMD comprises data indicative of its source device and its destination device. In other embodiments, a TMD can be configured to tag a communication with data indicative of a source device and destination device. By way of example, a TMD can be connected in series between two devices that communicate in a point-to-point fashion. In such a configuration, if the two devices communicate without including source and destination device data in their communications, the TMD can be configured to append to the communication source and destination data that is indicative of which of the two devices is the source device and which of the two devices is the destination device.

The TMD provides a computing device with communications data indicative of the communications received by the TMD. Based upon the communications data, the computing device generates a listing of devices that includes the source devices and destination devices for the various communications received by the TMD. The computing device can identify a source device and destination device for each of the communications based upon the communications data. The computing device computes a volume of traffic between pairs of devices in the listing of devices. The computing device then displays a graphical user interface that includes data that is indicative of communications traffic on the network based upon the computed volume of traffic, the communications traffic indicative of a potential attack on the network.

Technologies described herein find suitable application in a variety of control network configurations. While embodiments are described herein relative to ICS and BAS networks, it is to be understood that other types of control networks are contemplated as being within the scope of the present disclosure. Furthermore, it is to be understood that while exemplary industrial control and building automation system configurations are illustrated in the figures and discussed in greater detail below, other configurations of industrial control and building automation systems are contemplated. For example, an industrial control or building automation system can include point-to-point communication links, network communication links such as star topology or bus topology networks, serial communication links, parallel communication links, wired or wireless communication links, peer-to-peer communication links, etc. Further, industrial control and building automation systems within the scope of the present disclosure can employ any of various open or proprietary communications protocols employed in automation systems.

Figure 1:
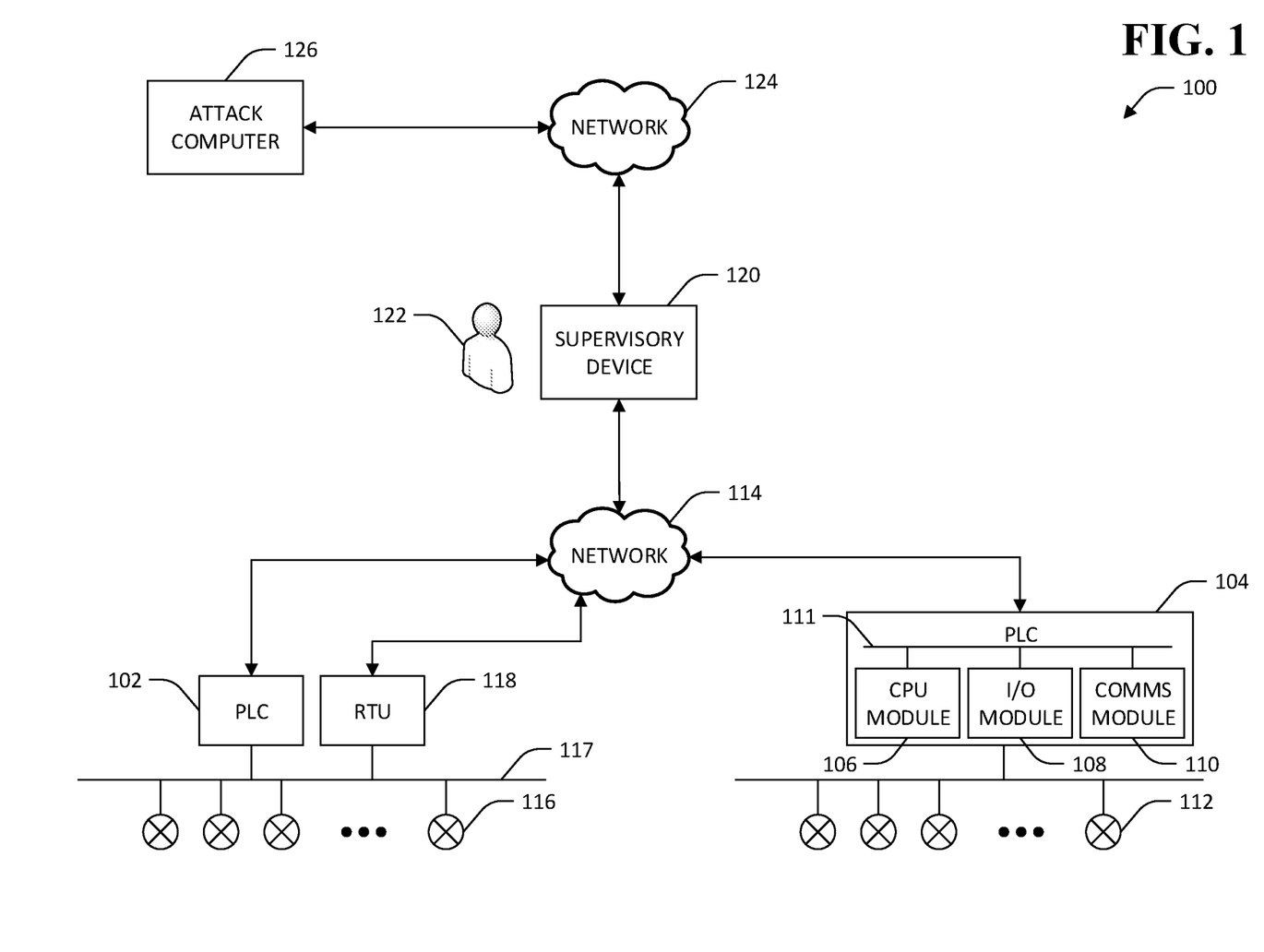
FIG. 1 is a functional block diagram of an exemplary ICS environment.

With reference now to FIG. 1, an exemplary ICS environment 100 is illustrated. The ICS environment 100 includes a first PLC 102 and a second PLC 104 that together facilitate control over the operation of all or part of an industrial process (e.g., manufacture of a product, operation of a refinery or power plant, etc.). The PLCs 102, 104 in turn each can comprise a plurality of modules that perform various functions described herein as being performed by the PLCs 102, 104. By way of example, the PLC 104 comprises a CPU module 106, an I/O module 108, and a communications module 110. The modules 106-110 communicate with one another by way of a backplane 111 of the PLC 104. The backplane 111 comprises a power and communications bus to which each of the modules 106-110 is connected. The CPU module 106 executes a program that is stored in memory of the CPU module 106. The CPU module 106 controls operations of the I/O module 108, the communications module 110, and any other modules desirably installed in the PLC 104 based upon execution of the program. The I/O module 108 receives input signals from and outputs signals to a first plurality of field devices 112. The I/O module 108 serves as an interface by way of which the CPU module 106 receives input signals from the field devices 112 and provides output signals to the field devices 112. The communications module 110 transmits data to and receives data from other devices by way of a network 114 to which the PLC 104 is connected. For example, the communications module 110 can transmit data to and receive data from the PLC 102 by way of the network 114.

The PLCs 102, 104 interface with a plurality of field devices in connection with operation of the industrial process. In the exemplary environment 100, the PLC 104 interfaces with the first plurality of field devices 112 and the PLC 102 interfaces with a second plurality of field devices 116. In other embodiments, more than one PLC may interface with a same field device. By way of example, two PLCs may receive input from a same sensor or switch. The field devices 112, 116 can include various types of sensors, actuators, motors, lights, heaters, relays, or substantially any other device that can interface with a PLC. The PLCs 102, 104 interface with their respective field devices 116, 112 by receiving electrical signals from or outputting electrical signals to the field devices 116, 112. For example, the PLCs 102, 104 can receive electrical input signals from switches, relays, sensors, etc., and can output electrical signals to switches, relays, motor control systems, etc. The PLCs 102, 104 can output and receive electrical signals to and from the field devices 116, 112 by way of various interfaces and protocols. For example, the field devices 116 can output and receive electrical signals to and from the PLC 104 by way of communications transmitted over a shared communications bus 117. In other examples, field devices interface directly with I/O terminals of a PLC.

In connection with carrying out the industrial process, the PLCs 102, 104 can exchange data by way of the network 114. As described above, the network 114 can be configured according to a variety of different topologies as will be understood by one of skill in the art. By way of example, the PLCs 102, 104 can be connected to a same communications bus and can communicate with each other by way of the communications bus. In another example, the PLCs 102, 104 can be connected to a common network switch, and communications routed to and from each of the PLCs 102, 104 by the network switch.

An ICS environment can further include remote terminal units (RTUs) and supervisory devices that allow a user to monitor a status of devices in the ICS. In an example, the ICS environment 100 includes an RTU 118 that interfaces with one or more of the second plurality of field devices 116. The ICS environment 100 further includes a supervisory device 120 that receives data from the RTU 118 and/or the PLCs 102, 104 by way of the network 114. In exemplary embodiments, the supervisory device 120 is a computing device such as a personal computer, a tablet or smartphone computing device, etc. that executes supervisory control and data acquisition (SCADA) software. A user 122 operates the supervisory device 120 in order to monitor a status of the PLCs 102, 104 and/or their respectively controlled field devices 116, 112. The PLCs 102, 104 and the RTU 118 can be configured to transmit status data to the supervisory device 120 responsive to receipt of a status update query from the supervisory device 120. In other embodiments, the PLCs 102, 104 and the RTU 118 are configured to transmit status data to the supervisory device 120 periodically according to a predefined timing schedule. The status data can include data indicative of various operating parameters of the PLCs 102, 104, the RTU 118, or the field devices 112, 116. By way of example, the PLC 104 can transmit status data to the supervisory device 120 that includes identifiers for each of the modules 106-110 that are connected to the backplane 111 of the PLC 104, a power-on or connectivity state of each of the modules 106-110, data pertaining to the field devices 112 (e.g., identifiers for each of the field devices 112, sensor readings from sensors in the field devices 112, operating speeds of motors in the field devices 112, etc.), or any other status information pertaining to the PLC 104 and its connected field devices 112 that is desirably presented to the user 122. The supervisory device 120 is configured to present all or part of the status data to the user 122 on a display.

In many applications, PLCs and other devices that interface with field devices in an ICS are connected only to a local network that is localized to a particular building or facility, or that is under the physical control of a single entity (e.g., a physically distributed network operated entirely by a single company). For example, in the exemplary ICS environment 100, the PLCs 102, 104 and the RTU 118 are connected only to the network 114. In some applications, however, it is desirable that devices other than PLCs be connected to various other networks. For example, a supervisory device performing SCADA functions may be desirably connected to other networks such as a business network or the Internet in order to facilitate communication between a supervisor who directs industrial operations at a plant and management personnel who direct other business operations located remotely from the plant. However, while a network that is physically contained within a single building or facility may be relatively secure to direct attack, other networks that are distributed or remote from the building or facility may be subject to subversion. In the ICS environment 100, the supervisory device 120 is connected to a second network 124 (e.g., the Internet). While access to the network 114 may be strictly controlled, access to the second network 124 may be unrestricted, or at least not subject to strict control by the entity or entities controlling the first network 114.

Thus, an attack computer 126 may be present on the second network 124. In an exemplary attack, the attack computer 126 can originate an attack on the first network 114 by first attacking the supervisory device 120 by way of the second network 124. By way of example, the attack computer 126 can transmit data to the supervisory device 120 that is configured to infect the supervisory device with malware. The malware executing on the supervisory device 120 can then cause the supervisory device 120 to transmit attack communications by way of the first network 114. The attack communications can be configured to disrupt or modify behavior of the PLCs 102, 104 or the RTU 118 in an undesirable way. For example, an attack communication transmitted by the supervisory device 120 to the PLCs 102, 104 or the RTU 118 by way of the first network 114 can change alarm limits, signal timing, logic conditions of a program executing on one of the PLCs 102, 104, etc.

Figure 2:
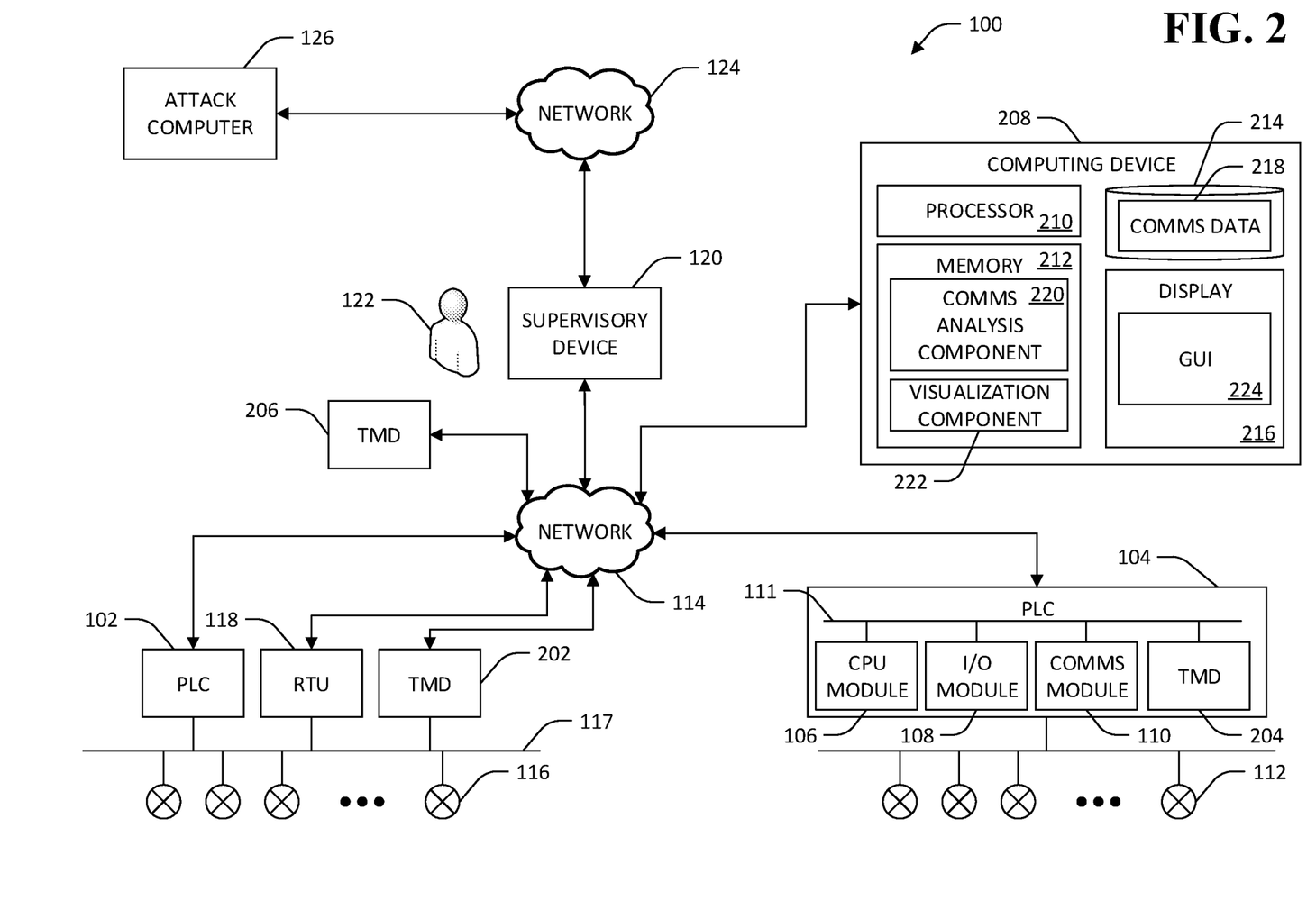
FIG. 2 is a functional block diagram of an exemplary system that facilitates detecting potential attacks to an ICS.

Referring now to FIG. 2, the exemplary ICS environment 100 is illustrated, wherein a plurality of TMDs 202-206 are connected to devices or subnetworks in the ICS environment 100 to monitor communications occurring in the ICS environment 100. The TMDs 202-206 receive communications transmitted between various devices in the ICS environment 100. The TMDs 202-206 then transmit communications data to a computing device 208 that analyzes the communications data and presents graphical data indicative of a potential attack on a part of the ICS environment 100. The TMDs 202-206 are connected to different elements in the ICS environment 100 to monitor communications between devices in different parts of the ICS environment 100. The TMD 202 is connected to the common communications bus 117 that connects the field devices 116, the PLC 102, and the RTU 118. Thus, the TMD 202 receives communications that originate at any of the field devices 116, the PLC 102, or the RTU 118, and that terminate at any other of the field devices 116, the PLC 102, or the RTU 118. For example, the TMD 202 can receive any of the following communications that may be transmitted over the communications bus 117: a transmission from the PLC 102 to one of the field devices 116; a transmission from one of the field devices 116 to the PLC 102; a transmission from a first device in the field devices 116 to a second device in the field devices 116; a transmission from the PLC 102 to the RTU 118; a transmission from the RTU 118 to the PLC 102; a transmission from the RTU 118 to one of the field devices 116; a transmission from one of the field devices 116 to the RTU 118, etc.

The TMDs 202-206 transmit communications data that is indicative of the communications received at each of the TMDs 202-206 to the computing device 208. The computing device 208 comprises a processor 210, memory 212 with computer-executable instructions loaded therein that are executed by the processor 210, a data store 214, and a display 216. The computing device 208 stores the communications data in the data store 214 as communications data 218 upon receipt of the communications data from the TMDs 202-206. The communications data 218 can include, for each of the communications received by the TMDs 202-206, a data message included in the communication, a timestamp indicating when the communication was received by the TMD, and various headers indicative of other information pertaining to the communication. The memory 212 has a communications analysis component 220 and a visualization component 222 loaded therein. The communications analysis component 220 analyzes the communications data 218 to identify physical or logical devices that transmit or receive the communications that are represented in the communications data 218. For example, with respect to communications received by the TMD 204, the communications analysis component 220 can identify physical devices that transmit or receive communications by way of the PLC backplane 111, such as the CPU module 106, the I/O module 108, the communications module 110, and the TMD 204 itself. In another example, with respect to communications received by the TMD 206, the communications analysis component 220 can identify devices that transmit or receive communications by way of the network 114, such as the supervisory device 120, the PLCs 102, 104, the RTU 118, and in some instances the TMDs 202, 206. In various applications, a physical device can be addressed by multiple addresses. Thus, a single physical device can be considered multiple logical devices, one for each address by which the physical device can be addressed. The communications analysis component 220 generates a listing of devices that communicate by way of various networks and subnetworks (e.g., the network 114, the backplane 111, the shared communications bus 117) in the ICS environment 100 based on the communications data 218.

The communications analysis component 220 then identifies a source device and a destination device for each of the communications represented in the communications data 218. In an example, the source device and destination device for a communication can be identified based on address data included in the communication. In other exemplary embodiments, a TMD may receive communications from a network that does not employ source and destination address information. For example, a TMD can receive communications that are exchanged between two devices that are connected by a point-to-point connection and that do not require address information to communicate. In such embodiments, a TMD can append source and destination information to communications data prior to transmitting the communications data to the computing device 208.

Subsequent to the communications analysis component 220 identifying source and destination devices for communications in the communications data 218, and computing a volume of communications traffic between each pair of devices in the listing of devices, the visualization component 222 can cause a GUI 224 to be displayed on the display 216 that is indicative of communications traffic between devices in the listing of devices. The GUI 224 can further comprise an indication of a potential attack on a network or subnetwork to which a TMD is connected. The communications analysis component 220 can be configured to analyze the communications data 218 for patterns indicative of a potential attack. In an exemplary embodiment, the communications analysis component 220 is configured with data that describes intended operational parameters for the ICS environment 100. This data can include parameters such as a listing of authorized devices, an expected volume of communications traffic, ranges of expected data to be transmitted or received by a particular device, etc. These operational parameters can be set by a user or supervisor of the computing device 208. In other embodiments, intended operational parameters for the ICS environment 100 can be determined by the computing device 208 based upon executing machine-learning algorithms over communications data for a period of time during which the ICS environment is known to be free from attacks. The communications analysis component 220 can then compare the communications data 218 to the intended operational parameters to identify whether a potential attack has occurred.

By way of an example, the communications analysis component 220 can include data that indicates a listing of devices that are authorized to communicate with one another. If the communications analysis component 220 determines based on the communications data 218 that non-authorized devices have communicated, or that devices that are not authorized to communicate with one another have actually communicated, then the communications analysis component 220 can output an indication of a potential attack, which can be displayed in the GUI 224.

In another example, the communications analysis component 220 can include data that indicates an expected range of data in a communication originating from a particular device. By way of example, for a temperature sensor, expected data can be temperatures within a predefined range. In the example, if the communications analysis component 220 determines that a communication originating from the temperature sensor includes data other than a temperature within the predefined range, the communications analysis component 220 can output an indication of a potential attack at the temperature sensor. The indication of the potential attack can then be displayed in the GUI 224.

It is to be understood that in some embodiments, a PLC or other computing device can perform functionality that is described herein as being performed by a TMD. In an example, the CPU module 106 of the PLC 104 can be configured to log communications transmitted between the modules 106-110 on the backplane 111 of the PLC 104, and to cause the PLC 104 to transmit those communications to the computing device 208 by way of the network 114. Further, it is to be understood that while the TMDs 202-206 are shown as communicating with the computing device 208 over the network 114, the TMDs can communicate with the computing device 208 by way of direct communications links (e.g., point-to-point between a TMD and the computing device 208), or by using other devices as communications intermediaries. By way of example, the TMD 202 can transmit communications data to the PLC 102, and the PLC 102 can be configured to retransmit the communications data to the computing device 208. In another example, the TMD 204 can transmit communications data to the communications module 110 of the PLC 104, and the communications module 110 can retransmit the communications data to the computing device 208. It is still further to be understood that operations described as being performed by the supervisory device 120 and the computing device 208 can be performed by a same computing device.

Figure 3:
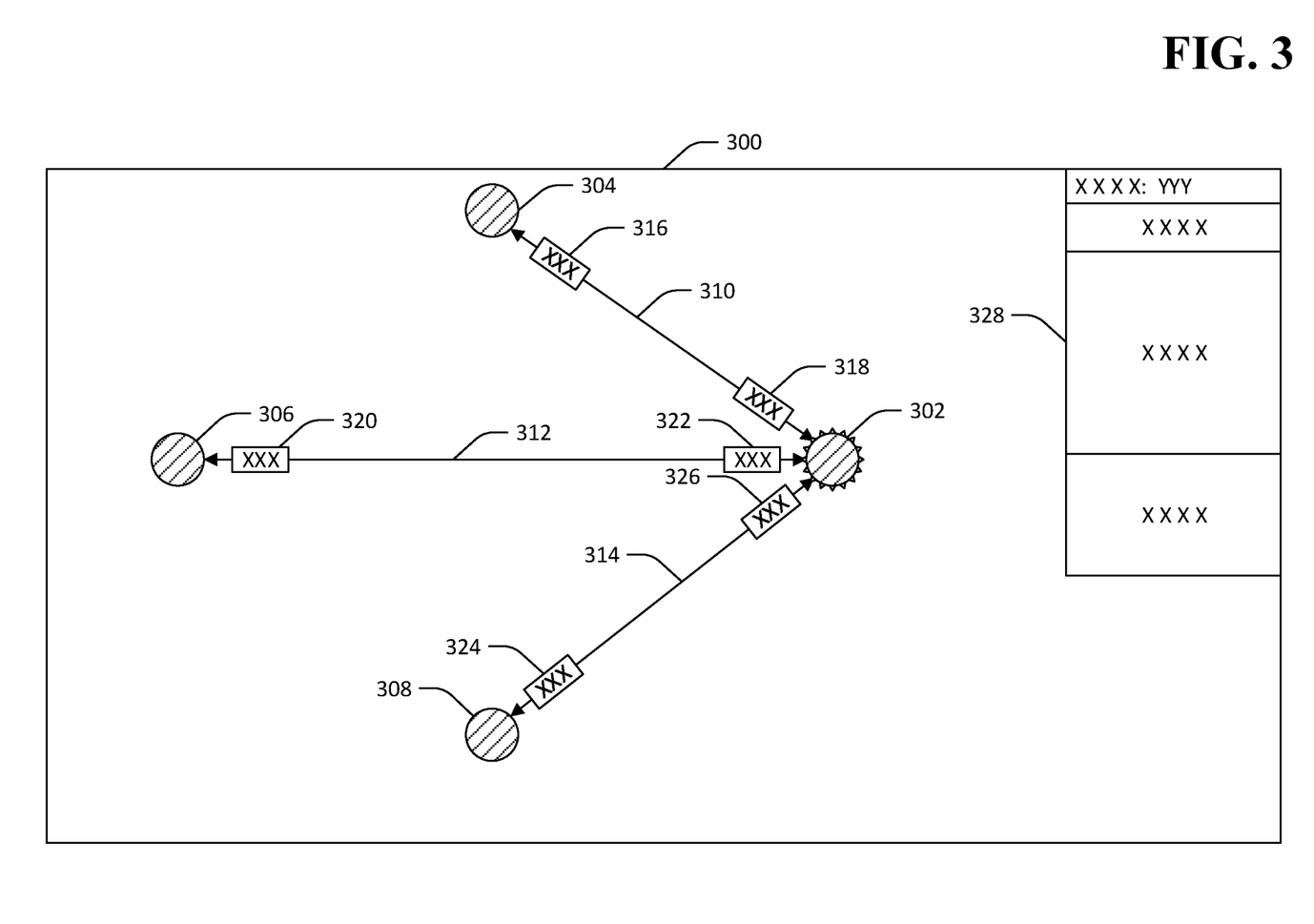
FIG. 3 is an exemplary graphical user interface (GUI).

Referring now to FIG. 3, an exemplary GUI 300 that can be displayed by the computing device 208 in connection with outputting data indicative of communications traffic in the ICS environment 100 is illustrated. The GUI 300 includes nodes 302-308 that each represent a physical or logical device that is either a source or destination device for one or more communications represented in the communications data 218. In an example, the nodes 302-308 can represent devices communicating by way of the backplane 111 of the PLC 104: the node 302 represents the CPU module 106, the node 304 represents the I/O module 108, the node 306 represents the communications module 110, and the node 308 represents the TMD 204. Each of the nodes 302-308 is connected to at least one other of the nodes 302-308 by a directed edge that comprises an indication of a volume of communications traffic over a period of time between devices represented by the nodes connected by the edge. The exemplary GUI 300 comprises an edge 310 that connects the nodes 302 and 304, an edge 312 that connects the nodes 302 and 306, and an edge 314 that connects the nodes 302 and 308. The edge 310 comprises an indication 316 of a volume of communications traffic from the CPU module 106 to the I/O module 108 over the period of time and an indication 318 of a volume of communications traffic from the I/O module 108 to the CPU module 106 over the period of time. The edge 312 comprises an indication 320 of a volume of communications traffic from the CPU module 106 to the communications module 110 over the period of time, and an indication 322 of a volume of communications traffic from the communications module 110 to the CPU module 106 over the period of time. Similarly, the edge 314 comprises an indication 324 of a volume of communications traffic from the CPU module 106 to the TMD 204 over the period of time, and an indication 326 of a volume of communications traffic from the TMD 204 to the CPU module 106. The indications of volume of communications 316-326 can be numbers of discrete communication elements (e.g., numbers of data packets), a total size of received data (e.g., a number of data bits), etc. In other exemplary embodiments, a volume of communications between a pair devices represented by a pair of nodes can be indicated by a thickness of an edge connecting the pair of nodes relative to other edges, a color of the edge relative to other edges, etc.

The GUI 300 shows communication occurring between the CPU module 106 of the PLC 104 (represented by the node 302) and each of the other modules of the PLC 104 (represented by nodes 304, 306), as well as the TMD 204 (represented by node 308). By contrast, no communication is shown between I/O module 108 and the communications module 110. This is in accordance with ordinary operation of a PLC, wherein the CPU module communicates with various modules of the PLC by way of the backplane but other modules of the PLC generally communicate primarily with the CPU module (or devices external to the PLC, in the case of a communications module).

The GUI 300 can include a detailed data pane 328 that is displayed responsive to receipt of a selection of one of the nodes 302-308 or edges 310-314 in the GUI 300. The detailed data pane 328 comprises further data relative to any of the nodes 302-308 or edges 310-314. For example, responsive to receipt of a selection of the node 302, a detailed data pane 328 can be displayed in the GUI 300 that includes data pertaining to the CPU module 106 and/or communications received by the TMD 204 that were sent or received by the CPU module 106 over the period of time. In exemplary embodiments, the detailed data pane 328 includes information such as a network address of the device represented by the selected node, message data in one or more communications received or transmitted by the device represented by the selected node, an indication of whether the device represented by the selected node is the source or target of an attack communication, etc.

In various embodiments, the computing device 208 can be configured to update data displayed in the GUI 224 in real time responsive to receipt of additional communications data from the TMDs 202-206 that is representative of new communications received at the TMDs 202-206. Thus, the computing device 208 can update the GUI 224 in real time to reflect additional communications occurring among devices in the ICS environment 100. By way of example, responsive to receipt of additional communications data from the TMDs 202-206, the communications analysis component 220 updates the previously generated listing of devices based on the additional communications data. The communications analysis component 220 further identifies source and destination devices for each of the communications represented in the additional communications data, and updates the volume of traffic between each pair of devices in the updated listing of devices based on the additional communications data. The visualization component 222 can then display the GUI 224 based on the updated listing of devices and updated volumes of traffic.

Figure 4A:
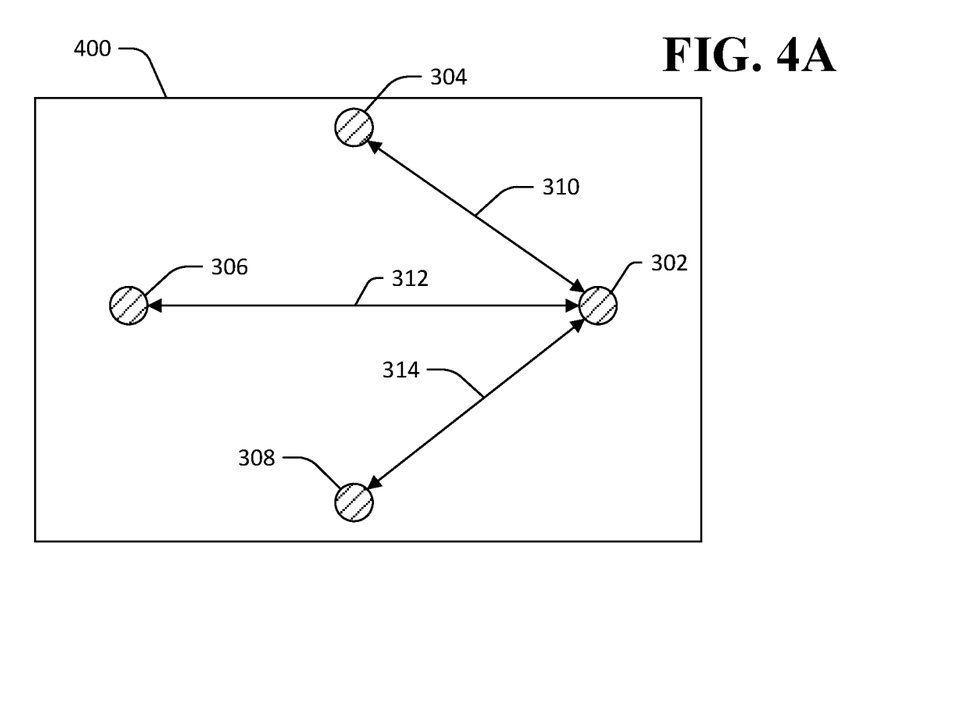
FIG. 4A is another exemplary GUI.
Figure 4B:
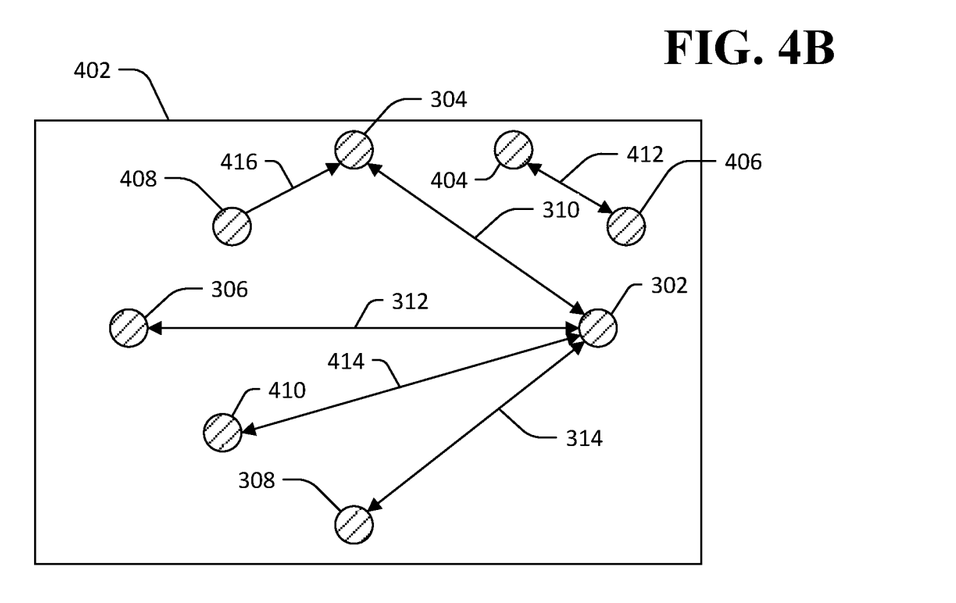
FIG. 4B is still another exemplary GUI.

For example, with reference now to FIGS. 4A and 4B, exemplary GUIs 400, 402 are illustrated wherein the first GUI 400 is an original GUI representative of communications traffic on the backplane 111 for a first period of time, and the second GUI 402 is an updated GUI representative of communications traffic on the backplane 111 for both the first period of time and a subsequent second period of time. The original GUI 400 can be replaced by the updated GUI 402 on the display 216 responsive to receiving from the TMDs 202-206 additional communications data that represents communications occurring in the ICS environment during the second period of time. Referring now solely to FIG. 4A, the original GUI 400 comprises the nodes 302-308 that are respectively representative of the CPU module 106, the I/O module 108, the communications module 110, and the TMD 204. The nodes 302-308 in the GUI 400 are connected by the edges 310-314 as in the exemplary GUI 300.

Referring now solely to FIG. 4B, the updated GUI 402 includes the nodes 302-308 and the edges 310-314, the edges 310-314 being updated to reflect updated volumes of communication based on the additional communications data. The updated GUI 402 further comprises nodes 404-410 that represent additional physical or logical devices that transmitted or received communications by way of the backplane 111 during the second period of time but not during the first period of time. The new nodes 404-410 are connected to other nodes in the GUI 402 by way of various edges 412-416. Bidirectional edge 412 connects nodes 404 and 406, bidirectional edge 414 connects nodes 410 and 302, while unidirectional edge 416 extends from node 408 to node 304. The additional nodes 404-410 and associated edges 412-416 can be indicative of expected or authorized traffic. For example, the nodes 404, 406 may represent additional modules installed on the backplane 111 of the PLC 104 subsequent to the first period of time. In other instances, additional nodes or edges can be representative of unexpected or unauthorized communications traffic. By way of another example, the node 408 can be representative of an unknown physical or logical device and the unidirectional edge 416 indicative of communications that are intended by an attacker to subvert the I/O module 108 (represented by the node 304). In an experimental application, a steady-state operation of a BAS network was monitored according to systems and methods described herein, and a resulting GUI indicative of communication on the BAS network indicated the presence of four communicating devices. In the experimental application, upon initiating a firmware update on the BAS network, a resulting updated GUI of communication indicated the presence of an additional nine logical communicating devices on the BAS network. A potential attack on a network, communications bus, backplane, device, etc. can be indicated by the appearance of a greater than expected number of logical devices in a visualization of its communications traffic.

In other exemplary embodiments, the visualization component 222 can filter data for display in the GUI 224 based upon user input. The user input can specify criteria of interest pertaining to communications traffic in the ICS environment 100, and the visualization component 222 can display the GUI 224 based on the criteria. For example, responsive to receipt of user input at the computing device 208 that is indicative of a time window of interest, the visualization component 222 can cause the GUI 224 to be displayed such that the GUI 224 comprises data indicative of communications traffic that occurred in the ICS environment 100 only in the time window of interest. Thus, the visualization component 222 can filter data that pertains to communications traffic received by the TMDs 202-206 for display in the GUI 224 based on user-defined parameters. In other examples, the visualization component 222 can filter data displayed in the GUI 224 based on a user-defined subnetwork. For example, responsive to receipt of user input at the computing device 208 that indicates a subnetwork of interest in the ICS environment 100, the visualization component 222 can display the GUI 224 based on the communications data 218 that is representative only of communications occurring on the subnetwork. Thus, responsive to receipt of a user indication that the shared communications bus 117 is the subnetwork of interest, the visualization component 222 can display the GUI 224 to be indicative only of communications traffic received by the TMD 202 that receives the communications that traverse the shared communications bus 117.

Figure 5:
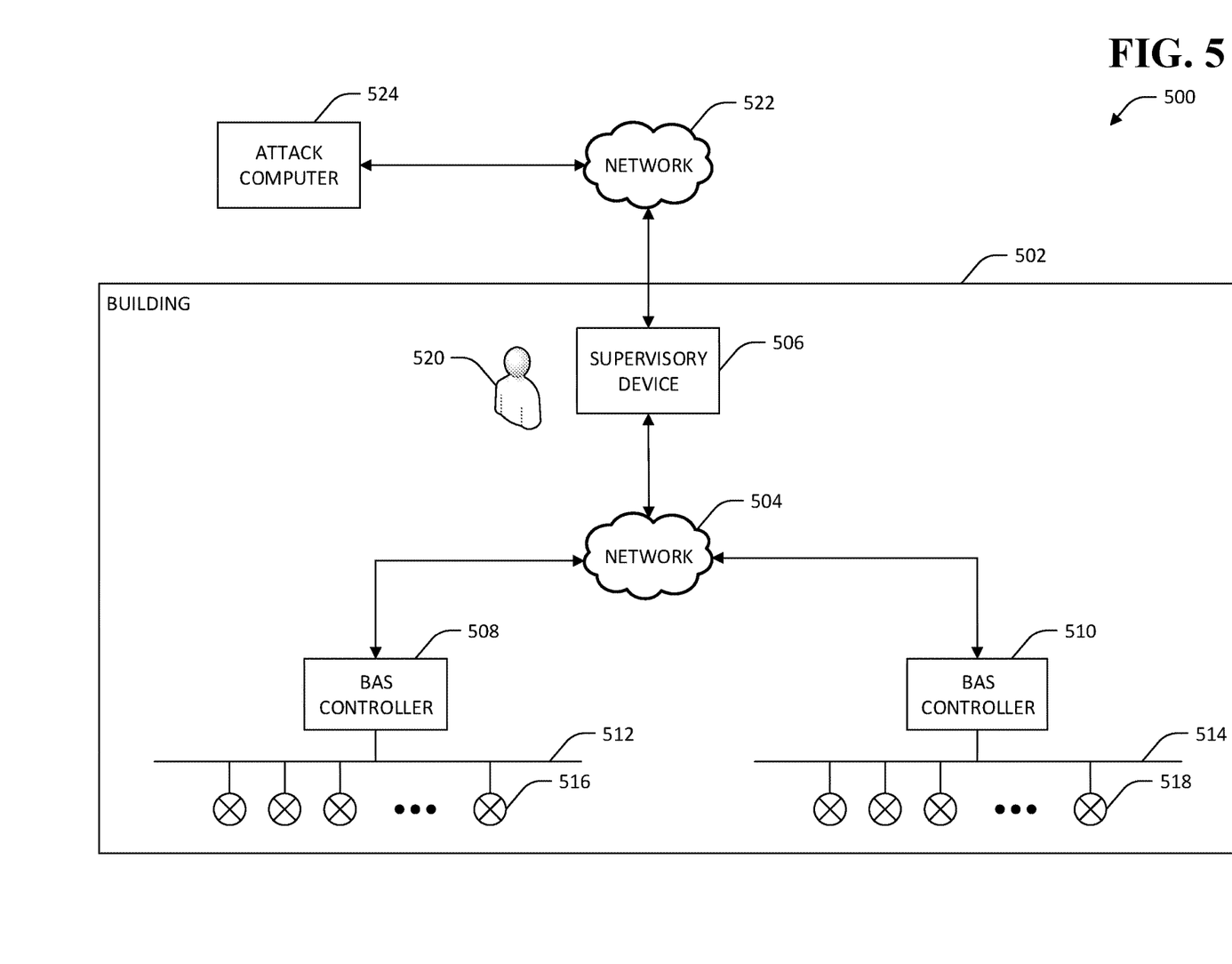
FIG. 5 is a functional block diagram of an exemplary BAS environment.

While exemplary embodiments pertaining to an ICS environment 100 have been described in detail above, it is to be understood that the technologies described herein are applicable to other types of networks. Referring now to FIG. 5, an exemplary BAS environment 500 is illustrated. The BAS environment 500 comprises a building 502 that is equipped with a BAS network 504 that connects a supervisory device 506 and a plurality of BAS controllers 508, 510. The BAS controllers 508 and 510 are in turn connected to respective communications buses 512 and 514. The BAS controller 508 controls operation of a first plurality of field devices 516 by way of the communications bus 512. Similarly, the BAS controller 510 controls operation of a second plurality of field devices 518 by way of the communications bus 514. In the BAS environment 500, the field devices 516 and 518 can be devices such as electronically controlled door locks, security cameras, heating, ventilation and air conditioning (HVAC) systems, lights, etc. In an exemplary embodiment, the BAS controller 508 controls lighting in the building 502 while the BAS controller 510 controls HVAC systems. The supervisory device 506, which may be substantially any computing device that executes software configured to interface with the BAS controllers 508, 510, is operated by a user 520 to define various operating parameters for the field devices 516, 518 of the building 502. The supervisory device 506 communicates the user-defined parameters to the BAS controllers 508, 510 by way of the network 504. The controllers 508, 510 then communicate with their respective field devices 516, 518 by way of the communications buses 512, 514 to facilitate operation of the field devices 516, 518 in accordance with user-defined parameters.

As in the exemplary ICS environment 100, the supervisory device 506 can be connected to an external network 522 (e.g., the Internet or other wide area network) that may not be strictly controlled by a same entity as controls, operates, or owns the building 502. The supervisory device 506 may therefore be vulnerable to attacks from an attack computer 524 that is connected to the network 522. If the supervisory device 506 is compromised by an attack originating from the attack computer 524, the supervisory device 506 can be used by an attacker as the source of further attacks on the network 504 and ultimately on the BAS controllers 508, 510 and their respectively connected field devices 516, 518.

Figure 6:
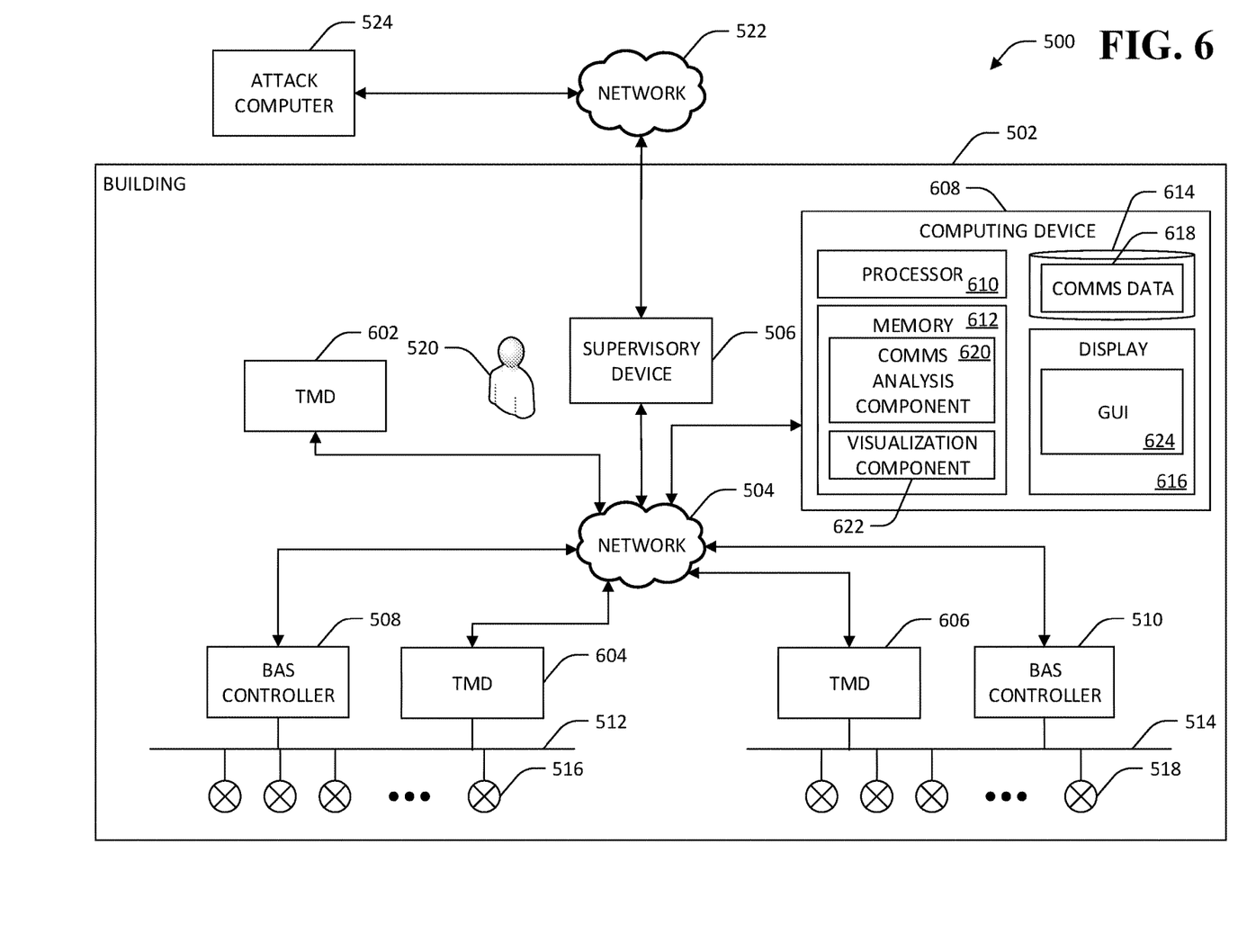
FIG. 6 is a functional block diagram of an exemplary system that facilitates detecting potential attacks to a BAS.

Referring now to FIG. 6, the BAS environment is shown 500 wherein TMDs 602-606 are connected to the network 504 and the communications buses 512, 514 to monitor communications in the network, and the TMDs 602-606 communicate with a computing device 608 that performs functionality that is substantially similar to functionality described above with respect to the computing device 208 in the ICS environment 100. The TMD 602 is connected to the network 504 and monitors communications transmitted and received by devices on the network 504. The TMD 604 is connected to the communications bus 512 and monitors communications transmitted and received by the BAS controller 508, the field devices 516, and any other devices that communicate by way of the communications bus 512. The TMD 606 is connected to the communications bus 514 and monitors communications transmitted and received by the BAS controller 510, the field devices 518, and any other devices that communicate by way of the communications bus 514. The TMDs 602-606 each receive communications transmitted by various devices on the network 504 and buses 512, 514. The TMDs 602-606 transmit communications data that is representative of the received communications to the computing device 608.

The computing device 608 comprises a processor 610, memory 612, a data store 614 and a display 616, as in the computing device 208. The data store 614 comprises communications data 618 that is received from the TMDs 602-606. The communications data 618 comprises data indicative of communications received by the TMDs 602-606 from the network 504 and the buses 512, 514, respectively. For instance, the communications data 618 can include, for each communication received by the TMDs 602-606, an address of a source device of the communication, an address of a destination device of the communication, a data message of the communication, and any other data included in the communication itself. The memory 512 comprises a communications analysis component 620 and a visualization component 622. The communications analysis component 620 generates a listing of devices based on the communications data 618. The listing of devices includes devices that are indicated in the communications data 618 as being a source or a destination device for a communication on the network 504 or the buses 512, 514. The communications analysis component 620 identifies a source device and a destination device for each of the communications represented in the communications data 618. The communications analysis component 620 then computes a volume of traffic between each pair of devices in the listing of devices. Subsequently, the visualization component 622 causes a GUI 624 to be displayed on the display 616, the GUI 624 indicative of communications traffic between devices in the BAS environment 500, which traffic can be indicative of a potential attack on a device in the BAS environment 500. In exemplary embodiments, the GUI 624 includes an indication of a volume of communications traffic between each pair of devices in the listing of devices. In further embodiments, the indication of the volume of traffic between each pair of devices is indicative of each of a volume of communications traffic from a first device in the pair to a second device in the pair as well as a volume of communications traffic from the second device in the pair to the first device in the pair.

Figure 7:
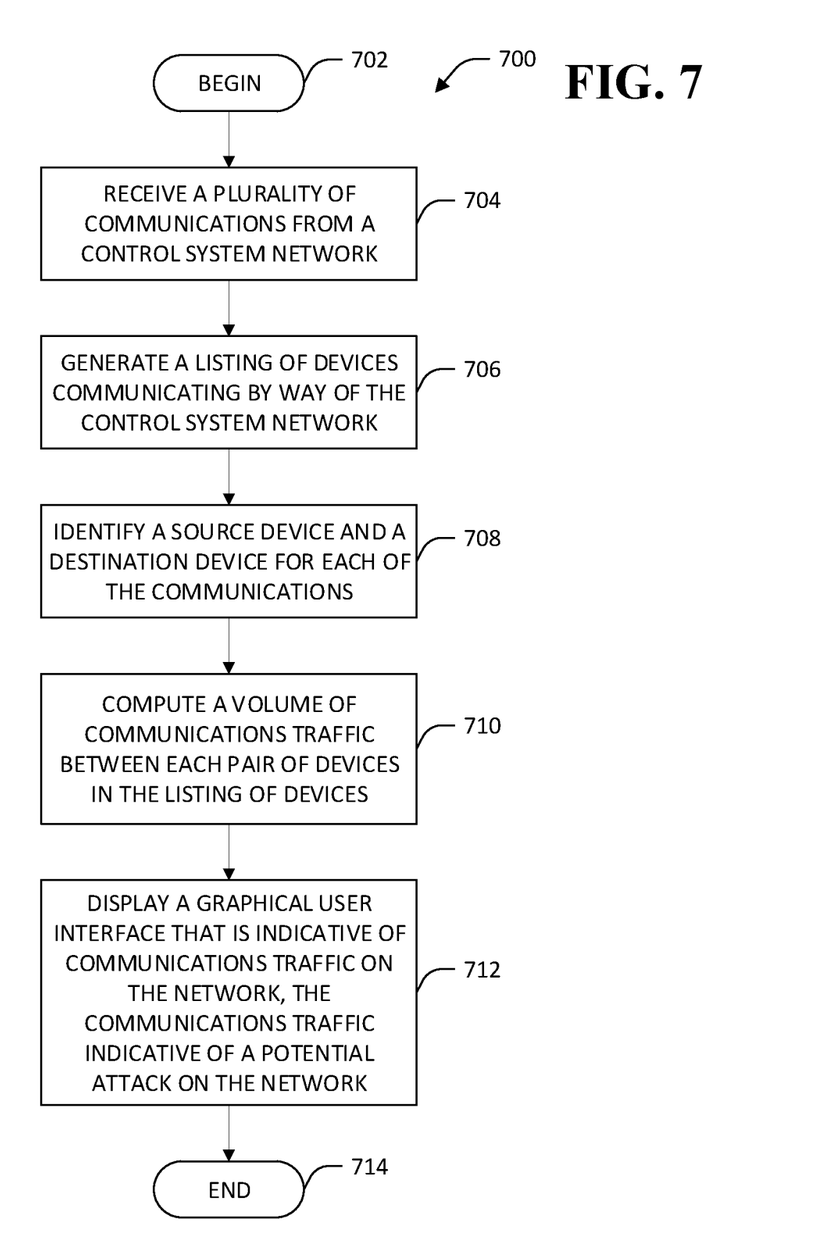
FIG. 7 is a flow diagram that illustrates an exemplary methodology for monitoring traffic on a control system network to facilitate detection of potential attacks on the control system network.

FIG. 7 illustrates an exemplary methodology relating to monitoring communications traffic on control and automation networks to facilitate detection of attacks on such networks. While the methodology is shown and described as being a series of acts that are performed in a sequence, it is to be understood and appreciated that the methodology is not limited by the order of the sequence. For example, some acts can occur in a different order than what is described herein. In addition, an act can occur concurrently with another act. Further, in some instances, not all acts may be required to implement the methodology described herein.

Moreover, the acts described herein may be computer-executable instructions that can be implemented by one or more processors and/or stored on a computer-readable medium or media. The computer-executable instructions can include a routine, a sub-routine, programs, a thread of execution, and/or the like. Still further, results of acts of the methodology can be stored in a computer-readable medium, displayed on a display device, and/or the like.

Referring now to FIG. 7, a methodology 700 that facilitates monitoring communications traffic on a control network in connection with detecting attacks on the control network is illustrated. The methodology 700 begins at 702, and at 704 a plurality of communications are received from a control system network. In exemplary embodiments, the control system network is an ICS network, a BAS network, or other network of computing and other devices that facilitates control and automation of a physical process. In various embodiments, the communications can be received by a computing device directly from a communications bus or other network interface. In other embodiments, the communications can be received by a computing device from a separate communications traffic monitoring device that receives the communications from a communications bus or other communications interface in the control system network. At 706, a listing of devices that communicate by way of the control system network is generated. For example, the computing device that receives the plurality of communications can generate the listing of devices based upon source and destination information in the communications (e.g., address headers). The devices in the listing of devices may be physical devices or logical devices, several of which can be embodied by a single physical device. At 708, a source device and a destination device is identified for each of the communications received from the control network. At 710 a volume of communications traffic between each pair of devices in the listing of devices is computed. In an exemplary embodiment, the volume of communications traffic between a first pair of devices is computed by counting a number of communications for which the identified source and destination devices are the devices in the first pair of devices. At 712, a GUI is displayed, wherein the GUI is indicative of communications traffic on the control system network, which communications traffic can be indicative of a potential attack on the network. The GUI can include data indicative of each of the volumes of communications computed at 710. The methodology 700 then ends at 714.

Figure 8:
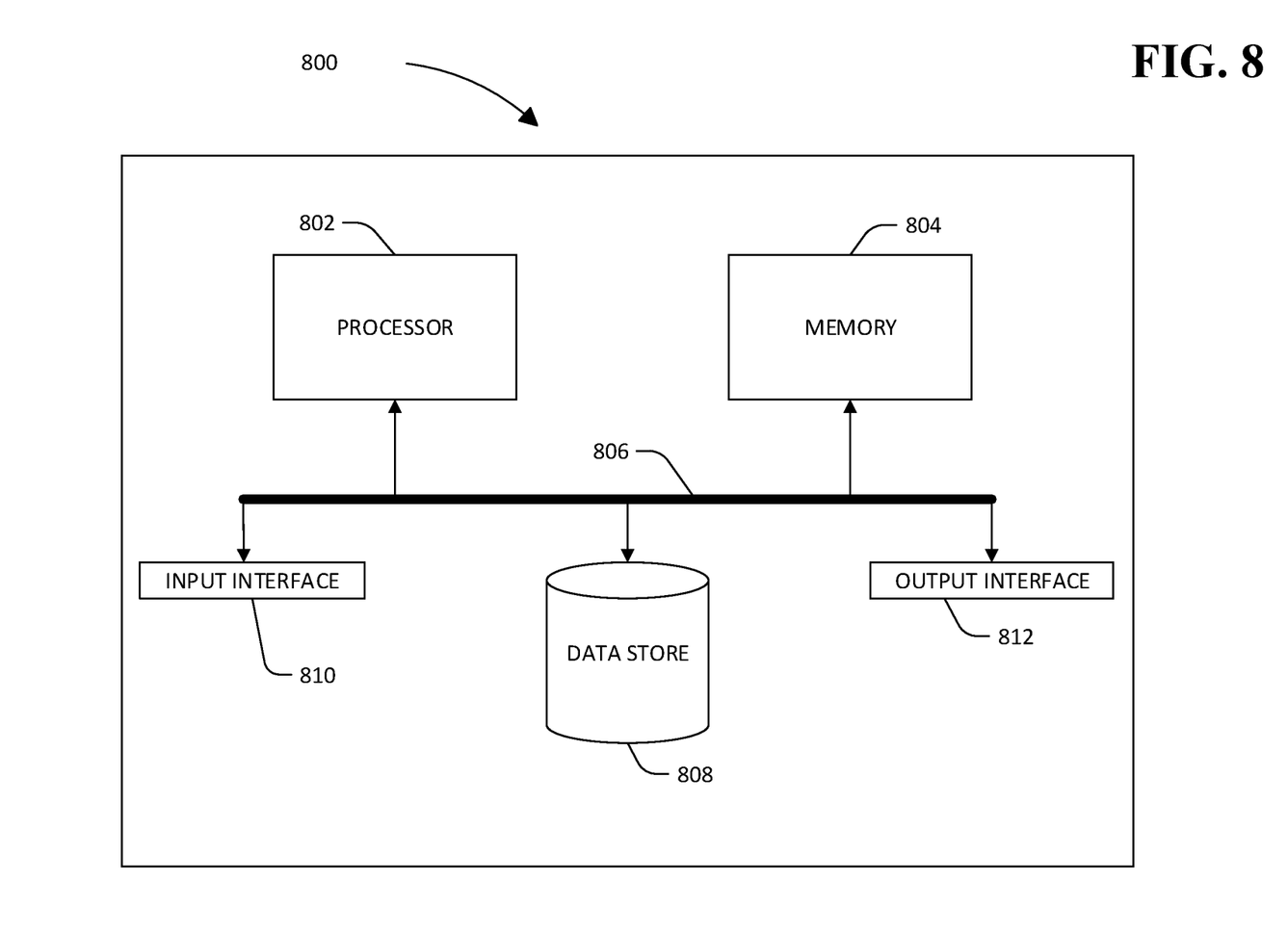
FIG. 8 is an exemplary computing system.

Referring now to FIG. 8, a high-level illustration of an exemplary computing device 800 that can be used in accordance with the systems and methodologies disclosed herein is illustrated. For instance, the computing device 800 may be used in a system that receives communications data from traffic monitoring devices in a control system network, and displays a GUI indicative of communications traffic on the control system network based on the communications data. By way of another example, the computing device 800 can be used to perform functions described herein as being performed by a traffic monitoring device, a supervisory device, etc. The computing device 800 includes at least one processor 802 that executes instructions that are stored in a memory 804. The instructions may be, for instance, instructions for implementing functionality described as being carried out by one or more components discussed above or instructions for implementing one or more of the methods described above. The processor 802 may access the memory 804 by way of a system bus 806. In addition to storing executable instructions, the memory 804 may also store communications data, control system configuration data, data pertaining to visualization of communications traffic in a control system network, etc.

The computing device 800 additionally includes a data store 808 that is accessible by the processor 802 by way of the system bus 806. The data store 808 may include executable instructions, communications data, etc. The computing device 800 also includes an input interface 810 that allows external devices to communicate with the computing device 800. For instance, the input interface 810 may be used to receive instructions from an external computer device, from a user, etc. The computing device 800 also includes an output interface 812 that interfaces the computing device 800 with one or more external devices. For example, the computing device 800 may display text, images, etc. by way of the output interface 812.

It is contemplated that the external devices that communicate with the computing device 800 via the input interface 810 and the output interface 812 can be included in an environment that provides substantially any type of user interface with which a user can interact. Examples of user interface types include graphical user interfaces, natural user interfaces, and so forth. For instance, a graphical user interface may accept input from a user employing input device(s) such as a keyboard, mouse, remote control, or the like and provide output on an output device such as a display. Further, a natural user interface may enable a user to interact with the computing device 800 in a manner free from constraints imposed by input device such as keyboards, mice, remote controls, and the like. Rather, a natural user interface can rely on speech recognition, touch and stylus recognition, gesture recognition both on screen and adjacent to the screen, air gestures, head and eye tracking, voice and speech, vision, touch, gestures, machine intelligence, and so forth.

Additionally, while illustrated as a single system, it is to be understood that the computing device 800 may be a distributed system. Thus, for instance, several devices may be in communication by way of a network connection and may collectively perform tasks described as being performed by the computing device 800.

Various functions described herein can be implemented in hardware, software, or any combination thereof. If implemented in software, the functions can be stored on or transmitted over as one or more instructions or code on a computer-readable medium. Computer-readable media includes computer-readable storage media. A computer-readable storage media can be any available storage media that can be accessed by a computer. By way of example, and not limitation, such computer-readable storage media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Disk and disc, as used herein, include compact disc (CD), laser disc, optical disc, digital versatile disc (DVD), floppy disk, and blu-ray disc (BD), where disks usually reproduce data magnetically and discs usually reproduce data optically with lasers. Further, a propagated signal is not included within the scope of computer-readable storage media. Computer-readable media also includes communication media including any medium that facilitates transfer of a computer program from one place to another. A connection, for instance, can be a communication medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio and microwave are included in the definition of communication medium. Combinations of the above should also be included within the scope of computer-readable media.

Alternatively, or in addition, the functionality described herein can be performed, at least in part, by one or more hardware logic components. For example, and without limitation, illustrative types of hardware logic components that can be used include Field-programmable Gate Arrays (FPGAs), Program-specific Integrated Circuits (ASIC s), Program-specific Standard Products (ASSPs), System-on-a-chip systems (SOCs), Complex Programmable Logic Devices (CPLDs), etc.

What has been described above includes examples of one or more embodiments. It is, of course, not possible to describe every conceivable modification and alteration of the above devices or methodologies for purposes of describing the aforementioned aspects, but one of ordinary skill in the art can recognize that many further modifications and permutations of various aspects are possible. Accordingly, the described aspects are intended to embrace all such alterations, modifications, and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:
1. A system comprising:
a first programmable logic controller (PLC);
a second PLC, wherein the first PLC and the second PLC are in communication by way of a network;
a monitoring device that receives a plurality of communications transmitted by way of the network over a period of time; and
a computing device comprising:
a processor
a display; and
memory comprising instructions that, when executed by the processor, cause the processor to perform acts comprising:
receiving the plurality of communications from the monitoring device;
generating, based upon the plurality of communications, a listing of devices communicating by way of the network, the listing of devices including the first PLC and the second PLC;
identifying a source device and a destination device for each of the plurality of communications;
computing, for each pair of devices in the listing of devices, a volume of communications traffic between the pair of devices over the period of time;
displaying, on the display, a graphical user interface (GUI) comprising data indicative of communications traffic on the network, the communications traffic indicative of a potential attack on the network, the GUI further comprising a directed graph, the directed graph including:
a plurality of nodes, each node in the plurality of nodes representative of a respective device in the listing of devices; and
a plurality of directed edges, each edge in the plurality of edges connecting a respective pair of nodes, each edge including data that is indicative of a computed volume of communications traffic over the period of time between devices represented by its respective pair of nodes;
executing a machine-learning algorithm over the plurality of communications received from the monitoring device;
based upon an output of the machine-learning algorithm, determining that an attack on the network occurred; and updating the GUI based upon the determination that the attack on the network occurred.

2. The system of claim 1, wherein the GUI comprises an indication of a first computed volume of communications traffic between a first pair of devices in the listing of devices over the period of time.

3. The system of claim 2, wherein the GUI comprises an indication of the computed volume of communications traffic between each pair of devices in the listing of devices over the period of time.

4. The system of claim 1, the acts further comprising:
responsive to receipt of a selection of a first node in the plurality of nodes, displaying first data pertaining to a first device, the first node representative of the first device.

5. The system of claim 4, the first data comprising a network address of the first device.

6. The system of claim 4, the first data comprising data pertaining to a plurality of communications transmitted or received by the first device over the period of time.

7. The system of claim 3, the acts further comprising:
receiving an additional communication from the monitoring device, the additional communication received at the monitoring device subsequent to the period of time;
updating the computed volume of communications traffic between a first device in the listing of devices and a second device in the listing of devices based upon the additional communication; and
displaying in the GUI the updated computed volume of communications traffic.

8. The system of claim 1, further comprising a second monitoring device, the second monitoring device configured to receive a second plurality of communications over the period of time.

9. The system of claim 8, the acts further comprising receiving the second plurality of communications from the second monitoring device;
generating, based upon the second plurality of communications, a second listing of devices, the second listing of devices comprising modules of the first PLC;
identifying a source device in the second listing of devices and a destination device in the second listing of devices for each of the second plurality of communications;
computing, for each pair of devices in the second listing of devices, a volume of communications traffic between the pair of devices over the period of time.

10. The system of claim 8, the second monitoring device communicatively coupled to a backplane of the first PLC.

11. The system of claim 8, the second monitoring device communicatively coupled to a communications bus, wherein the first PLC is communicatively coupled to a plurality of field devices by way of the communications bus.

12. A system comprising:
a first building automation system (BAS) controller;
a second BAS controller, wherein the first BAS controller and the second BAS controller are in communication by way of a BAS network;
a monitoring device that receives a plurality of communications transmitted by way of the BAS network over a period of time; and
a computing device comprising:
a processor
a display; and
memory comprising instructions that, when executed by the processor, cause the processor to perform acts comprising:
receiving the plurality of communications from the monitoring device;
generating, based upon the plurality of communications, a listing of devices communicating by way of the BAS network, the listing of devices including the first BAS controller and the second BAS controller;
identifying a source device and a destination device for each of the plurality of communications;
computing, for each pair of devices in the listing of devices, a volume of communications traffic between the pair of devices over the period of time; and
displaying, on the display, a graphical user interface (GUI) comprising data indicative of communications traffic on the network, the communications traffic indicative of a potential attack on the network, the GUI further comprising a directed graph, the directed graph including:
a plurality of nodes, each node in the plurality of nodes representative of a respective device in the listing of devices; and
a plurality of directed edges, each edge in the plurality of edges connecting a respective pair of nodes, each edge including data that is indicative of a computed volume of communications traffic over the period of time between devices represented by its respective pair of nodes;
executing a machine-learning algorithm over the plurality of communications received from the monitoring device;
based upon an output of the machine-learning algorithm, determining that an attack on the network occurred; and
updating the GUI based upon the determination that the attack on the network occurred.

13. The system of claim 12, the plurality of communications being first communications, and wherein the first BAS controller controls functionality of a plurality of devices by way of a communications bus, the system further comprising a second monitoring device that receives a second plurality of communications from the communications bus over the period of time, the acts further comprising:
receiving the second plurality of communications from the second monitoring device;
updating the listing of devices based further upon the second communications;
identifying a source device and a destination device for each of the second plurality of communications;
computing the volume of communications traffic based upon the first plurality of communications and the second plurality of communications; and
wherein displaying the GUI is based upon the first plurality of communications and the second plurality of communications.

14. The system of claim 12, wherein the GUI comprises an indication of a first computed volume of communications traffic between a first pair of devices over the period of time.

15. The system of claim 14, wherein the indication of the first computed volume of communications traffic comprises:
an indication of a second computed volume of communications traffic from a first device in the first pair of devices to a second device in the first pair of devices over the period of time; and an indication of a third computed volume of communications traffic from the second device in the first pair of devices to the first device in the first pair of devices over the period of time.

16. The system of claim 12, the acts further comprising:
receiving a second plurality of communications from the monitoring device, the second plurality of communications received by the monitoring device, the second plurality of communications transmitted by way of the network over a second period of time;
updating the listing of devices and the computed volumes of communications traffic based on the second plurality of communications; and
displaying, on the display, an updated GUI comprising data indicative of the updated computed volumes of communications traffic.

17. A system comprising:
a programmable logic controller (PLC) that comprises a plurality of modules connected to a common backplane;
a monitoring device that receives a plurality of communications transmitted by way of the common backplane of the PLC over a period of time; and
a computing device comprising:
a processor
a display; and
memory comprising instructions that, when executed by the processor, cause the processor to perform acts comprising:
receiving communications data from the monitoring device, the communications data pertaining to the plurality of communications received by the monitoring device;
generating, based upon the communications data, a listing of devices communicating by way of the common backplane, the listing of devices comprising a module of the PLC;
identifying a source device and a destination device for each of the plurality of communications based on the communications data;
computing, for each pair of devices in the listing of devices, a volume of communications traffic between the pair of devices over the period of time; and
displaying, on the display, a graphical user interface (GUI) comprising data indicative of communications traffic on the network, the communications traffic indicative of a potential attack on the network, the GUI further comprising a directed graph, the directed graph including:
a plurality of nodes, each node in the plurality of nodes representative of a respective device in the listing of devices; and
a plurality of directed edges, each edge in the plurality of edges connecting a respective pair of nodes, each edge including data that is indicative of a computed volume of communications traffic over the period of time between devices represented by its respective pair of nodes;
executing a machine-learning algorithm over the plurality of communications received from the monitoring device;
based upon an output of the machine-learning algorithm, determining that an attack on the network occurred; and
updating the GUI based upon the determination that the attack on the network occurred.

* * * * *